US012512293B2

(12) United States Patent
Van Gestel et al.

(10) Patent No.: US 12,512,293 B2
(45) Date of Patent: Dec. 30, 2025

(54) REDUCTION OF IMAGE DRIFT IN A MICROSCOPY SYSTEM

(71) Applicant: FEI Company, Hillsboro, OR (US)

(72) Inventors: Nick Van Gestel, Eindhoven (NL); Nick Verwimp, Eindhoven (NL); Ruud Krijnen, Eindhoven (NL)

(73) Assignee: FEI Company, Hillsboro, OR (US)

( * ) Notice: Subject to any disclaimer, the term of this patent is extended or adjusted under 35 U.S.C. 154(b) by 469 days.

(21) Appl. No.: 17/853,607

(22) Filed: Jun. 29, 2022

(65) Prior Publication Data

US 2023/0005703 A1 Jan. 5, 2023

(30) Foreign Application Priority Data

Jun. 30, 2021 (EP) ..................... 21182957

(51) Int. Cl.
*H01J 37/20* (2006.01)
*G02B 21/28* (2006.01)
*H01J 37/28* (2006.01)

(52) U.S. Cl.
CPC ............. *H01J 37/20* (2013.01); *G02B 21/28* (2013.01); *H01J 37/28* (2013.01)

(58) Field of Classification Search
CPC ...... H01J 37/20; H01J 37/28; H01J 2237/002; H01J 37/244; H01J 37/26; H01J 37/222; G02B 21/28
See application file for complete search history.

(56) References Cited

U.S. PATENT DOCUMENTS

| 4,179,605 A | * | 12/1979 | Watanabe ............... H01J 37/18 250/311 |
| 5,811,816 A | | 9/1998 | Gallagher et al. |
| 6,495,838 B1 | | 12/2002 | Yaguchi et al. |
| (Continued) | | | |

FOREIGN PATENT DOCUMENTS

| JP | 2009245907 A | * | 10/2009 | |
| WO | WO-2014175074 A1 | * | 10/2014 | ............... B25J 7/00 |

OTHER PUBLICATIONS

Wikipedia contributors. "Cold trap." Wikipedia, The Free Encyclopedia. Wikipedia, The Free Encyclopedia, May 19, 2021. Web. Jan. 8, 2025. (Year: 2021).*

(Continued)

*Primary Examiner* — Wyatt A Stoffa
*Assistant Examiner* — Christopher J Gassen (57) ABSTRACT

The invention relates to a sample holder for a microscopy system comprising a material with a low thermal conductivity for reducing a drift of the sample holder when inserted into a microscope. The invention also relates to a cold trap for a microscopy system comprising a sample holder, wherein the cold trap comprises a coating with a high thermal emissivity to increase a heat load between the sample holder and the cold trap. The invention also relates to a microscopy system comprising a first element configured to have a first temperature, a second element configured to have a second temperature, and a third element configured to have a third temperature, wherein the third element is configured to be located at a plurality of different distances from the first element, wherein the microscopy system is configured to image a sample and to reduce a drift of the image.

13 Claims, 5 Drawing Sheets

(56) References Cited

U.S. PATENT DOCUMENTS

| | | | |
|---|---|---|---|
| 2009/0224788 A1* | 9/2009 | Sasajima | G01R 31/2891 |
| | | | 324/754.21 |
| 2011/0175202 A1* | 7/2011 | Raming | C30B 15/14 |
| | | | 257/617 |
| 2014/0077080 A1* | 3/2014 | Von Harrach | H01J 37/28 |
| | | | 250/311 |
| 2016/0276126 A1 | 9/2016 | Zandbergen | |
| 2017/0221676 A1* | 8/2017 | Sunaoshi | H01J 37/28 |

OTHER PUBLICATIONS

Extended Search Report for EP Application 21182957.7, dated Mar. 28, 2022.

* cited by examiner

REDUCTION OF IMAGE DRIFT IN A MICROSCOPY SYSTEM

FIELD OF THE INVENTION

The present invention relates to the field of microscopy systems. In particular, it relates to a system for reducing image drift of a microscopy system. More particularly, it relates to a system for reducing thermal drift of a sample holder and corresponding methods thereof.

BACKGROUND

Microscopy systems are widely used for not only observing samples, but also for manufacturing, processing, and machining samples. In a typical microscopy system, a beam of particles is directed on to a sample supported on a sample holder, the particles in the beam interact with the sample and cause a variety of emissions from the sample which may then be captured by a variety of detectors. The beam may comprise charge-neutral particles such as photons, or charged particles such as electrons or ions, depending on the intended use and resolution of the microscope system. The microscopy system may also comprise optics (that may be electromagnetic or electrostatic or magnetostatic) to direct the beam at a certain location on the sample, and to focus it.

Electrons and ions may offer higher resolution owing to their shorter wavelengths (because of higher mass of electrons and ions compared to photons). However, charged particles may have to be accelerated to high kinetic energies to achieve a resolution comparable to or better than optical microscopes. Higher energies may lead to greater cross-section for interacting with neutral molecules and thus such systems are typically operated in vacuum conditions in a vacuum column or a vacuum chamber.

In some vacuum chambers, a cold trap may also be provided to prevent contamination of the vacuum pump and/or the sample by vapors. The temperature of the cold trap may typically be different from that of the vacuum chamber. Thus, a heat flow may occur between the cold trap and the sample holder (that may be at thermal equilibrium with the vacuum chamber).

Detectors for charged particle microscopy systems may also be typically cooled to temperatures as low as −40° C. to reduce dark current and improve signal-to-noise. In addition, detectors may be retractable, allowing them to deployed for detection and retracted otherwise.

The deployment and retraction of detectors may cause a significant temperature variation at the sample holder. For example, once the sample holder (with the sample) has been inserted into the vacuum chamber, the beam may be aligned with the sample and the microscopy system prepared for subsequent operation. After equilibration, the sample holder will be at the ambient temperature of the vacuum chamber, possibly with also the cold trap inside the chamber.

At a later time, the cooled detector(s) may be deployed close to the sample holder to capture emissions from the interaction of the beam with the sample. The deployment of cooled detector(s) may result in a change in the heat flow between the sample holder and the detector(s) owing to the change in the distance of the detector(s). The detector(s) may also shield, at least in part, the cold trap resulting in a change in the heat flow between the sample holder and the cold trap. Thus, an overall variation in heat flow from/to the sample holder may occur due to a change in the distance from the detector(s). This may result in a thermal drift. As a result, the alignment of the image may be disturbed and the image may start to drift. The magnitude of the drift may depend on the temperature difference between the cold detector(s) and the temperature of the sample holder before deployment of the detector(s). In typical systems, the drift may be as large as, for example, 200 nm, whereas a typical expected resolution may be, for example, 1 nm. The system may then have to be allowed to settle down into a new equilibrium condition which may take, for example, 1 hour. This may then lead to inefficiency in operating the system.

Embodiments of the present technology aim to improve the efficiency of microscopy systems by reducing the drift of the image owing to thermal variations at the sample holder. They may be of particular relevance for microscopy systems used for fabrication and/or machining of micro or nano structures where such drifts may have a particularly adverse impact.

SUMMARY

The present invention seeks to overcome or at least alleviate the shortcomings and disadvantages of the prior art. More particularly, it is an object of the present invention to provide an improved system and method for reducing image drift of a microscopy system.

In a first aspect, the present invention relates to a sample holder for a microscopy system comprising a material with a low thermal conductivity for reducing a drift of the sample holder when inserted into a microscope. The drift may be a thermal drift arising from inserting the sample holder from a temperature different from that as the inside of the microscope. Or, it may arise from inserting other elements at a temperature different from the sample holder into the microscope. In either case, thermal drift causes the image of a sample to drift until the sample holder reaches thermal equilibrium with its environment. The attainment of equilibrium may take long, thus reducing the efficiency of the imaging process.

The sample holder may be configured to hold a sample so as to allow imaging at least a part of the sample in a microscope. This may comprise translation and/or rotation of the sample holder, with means provided to drive such movements.

The sample holder may comprise an elongated rod and a tip for holding the sample, wherein an intermediate part is provided between the rod and the tip, the intermediate part comprising the material with the low thermal conductivity. The intermediate part may comprise materials such as Zerodur with a thermal conductivity of 1.46 W/m/K. On the other hand, typically, the rod may comprise a material such as Phosphor Bronze (CuSn) that has a thermal conductivity of 75 W/m/K. Thus, the thermal conductivity of the rod may be reduced, lowering the thermal drift of the rod, and consequently, the sample holder.

A length of the intermediate part may be between 0.01 and 20 times of the length of the rod.

The thermal conductivity of the material may be between 0.1 W/m/K and 100 W/m/K.

The sample holder may further comprise an ultra-low expansion (ULE) material, wherein a coefficient of thermal expansion of the ULE material is between $10^{-9}/°$ C. and $100/°$ C. The thermal drift of the sample holder may also be reduced by reducing a coefficient of thermal expansion of the sample holder. For example, Zerodur with a coefficient of thermal expansion $10^{-7}/°$ C. may also be used as a ULE material.

The intermediate part as described above may comprise the ULE material.

The intermediate part as described above may be manufactured by a casting process.

The intermediate part as described above may be manufactured by an injection molding process.

The intermediate part as described above may be manufactured by an additive manufacturing process.

In a second aspect, the present invention relates to a high emissivity component for a microscopy system comprising a sample holder, wherein the high emissivity component comprises, at least in part, a coating with a high thermal emissivity to increase a heat load between the sample holder and the high emissivity component. The high emissivity component may help to prevent contamination of the sample and/or the vacuum pumps. The high emissivity component may comprise one of the objects with which the sample holder may have heat exchange. Increasing the heat load by increasing the emissivity of the high emissivity component may help reduce variation in the heat load at the sample holder if the heat exchange with the high emissivity component becomes a significant contributor to the total heat load at the sample holder.

The coating may comprise a material with an operational electromagnetic wavelength between 300 nm and 1000 μm.

The coating may comprise a material with a thermal emissivity between 0.5 and 1.

The coating may comprise a material with a working temperature between −273° C. and 0° C.

The coating may comprise a material with an areal density between 0.1 mg/cm$^2$ and 10 mg/cm$^2$.

The high emissivity component may be coated for a surface area ranging from at least 5% to at most 100%. A larger coated area may help to increase the rate of heat exchange between the high emissivity component and the sample holder.

The coating may have a uniform thickness over the coated part of the high emissivity component. The uniform thickness may be between 1 nm and 1 cm.

Alternatively, the coating may have a variable thickness over the coated part of the high emissivity component such that a minimum thickness of the coating may be between 1 nm and 1 cm and a maximum thickness of the coating may be between 1 nm and 1 cm over the coated part of the high emissivity component. This may be of advantage if only a fraction of the surface area of the high emissivity component accounts for most of the heat exchange with the sample holder.

The coating may comprise a non-magnetic material, an organic material, or an inorganic material.

The uncoated part of the high emissivity component may comprise a material with a thermal emissivity between 0 and 90 for wavelengths between 300 nm and 1000 μm. In particular, the thermal emissivity of the coating may be larger than that of the uncoated part of the high emissivity component to increase the heat load at the sample holder.

The high emissivity component may comprise a cold trap.

In a third aspect, the present invention relates to a microscopy system comprising a first element configured to have a first temperature (T1), a second element configured to have a second temperature (T2), and a third element configured to have a third temperature (T3), wherein the third element is configured to be located at a plurality of different distances from the first element, wherein the microscopy system is configured to at least image a sample and to reduce a drift of the image.

The first element may comprise a sample holder as described above. Or the first element may comprise a sample holder.

The second element may comprise a high emissivity component as described above.

The third element may comprise a detector. Thus, the microscopy system may comprise a detector (or a plurality of detectors) that may be retracted and deployed. This may allow for better positioning of the sample.

The second temperature may be different from the first temperature and the third temperature may be different from the first temperature. Because of a difference in temperature, the change in position of the detector may lead to a variable heat exchange with the sample holder. For example, if the detector is colder than the sample holder, a larger heat flow may occur when the detector is deployed than when it is retracted. This may cause the sample holder to drift. However, by employing a sample holder as described above, the change in length of the sample holder due to thermal variation may be reduced. Similarly, by employing a cold trap with a high emissivity coating, heat exchange with the cold trap may be made large enough that the variation occurring due to the changing distance of the detector may be small.

A heat flow between the first element and the second element may be, at least in part, radiative.

A heat flow between the first element and the third element may be, at least in part, radiative.

A result of the variation in the distance of the third element from the first element may be a variation in the radiative heat flow from the first element. As described above, for example, a cold detector (compared to the sample holder) would lead to higher radiative heat flow when positioned closer to the sample holder than when positioned farther away.

A result of the variation in the distance of the third element from the first element may be a variation in the radiative heat flow between the first element and the second element. For example, a cold detector may partly shield the cold trap from the sample holder when it is deployed close to the sample holder. Thus, the radiative heat flow between the sample holder and the cold trap may be changed.

The microscopy system may be configured to reduce a drift of the image by reducing the variation in the radiative heat flow from the first element as the distance to the third element is varied.

The reduction in the variation in the radiative heat flow from the first element may be between 1% and 100%.

The microscopy system may comprise a vacuum chamber configured to house the first element, the second element, and the third element. The vacuum chamber may allow the heat flow to be dominated by radiation instead of, for example, convection.

A pressure in the vacuum chamber may be less than $10^{-5}$ Pa.

A temperature of the vacuum chamber may be significantly identical to the temperature (T1) of the first element.

A difference between the first temperature and the second temperature may be between 20° C. and 1000° C., preferably between 50° C. and 300° C., further preferably between 100° C. and 200° C. In particular, the second element may be hotter than the first element, so that the direction of heat flow is from the second element to the first element.

A difference between the first temperature and the third temperature may be between 20° C. and 1000° C., preferably between 50° C. and 300° C., further preferably between 100° C. and 200° C. In particular, the third element may be hotter than the first element and the direction of heat flow may be from the third element to the first element.

The first temperature may be between 0° C. and 100° C., preferably between 15° C. and 50° C., further preferably between 25° C. and 35° C.

The second temperature may be between −273° C. and 0° C., preferably between −269° C. and −123° C., further preferably between −253° C. and −153° C.

The third temperature may be between −273° C. and 0° C., preferably between −100° C. and 0° C., further preferably between −75° C. and −35° C.

The microscopy system may be configured to direct a beam of charged particles at the sample.

The charged particles may comprise electrons, or ions. The ions may comprise any positively charged ions such as $Ga^+$, $Ar^+$, $Ne^+$, $Xe^+$, among others.

The microscopy system may be further configured to accelerate the charged particles by applying a voltage between 1 V and 1000 kV.

The reduction in the image drift may be between 1% and 100%. This reduction may be with reference to the drift before employing a sample holder and/or a high emissivity component as described above.

In a fourth aspect, the present invention relates to a method for reducing an image drift of a microscopy system comprising a first element configured to have a first temperature (T1), a second element configured to have a second temperature (T2), and a third element configured to have a third temperature (T3), wherein the third element is configured to be located at a plurality of different distances from the first element, wherein the method comprises imaging a sample and reducing a drift of the image.

The first element may comprise a sample holder as described above.

The method may comprise reducing the drift of the image by reducing the thermal drift of the sample holder.

The second element may comprise a high emissivity component as described above.

The third element may comprise a detector configured to image the sample.

The microscopy system may further comprise a vacuum chamber configured to house the first element, the second element, and the third element.

The second temperature may be different from the first temperature and the third temperature may be different from the first temperature.

A heat flow between the first element and the second element may be, at least in part, radiative.

A heat flow between the first element and the third element may be, at least in part, radiative.

A result of the variation in the distance of the third element from the first element may be a variation in the radiative heat flow from the first element and the method may comprise reducing a drift of the image by reducing the variation in the radiative heat flow from the first element as the distance to the third element is varied.

A result of the variation in the distance of the third element from the first element may be a variation in the radiative heat flow between the first element and the second element and the method may comprise reducing a drift of the image by reducing the variation in the radiative heat flow from the first element as the distance to the third element is varied.

BRIEF DESCRIPTION OF THE DRAWINGS

Embodiments of the present technology will now be discussed with reference to the accompanying figures.

DETAILED DESCRIPTION

Figure 1:
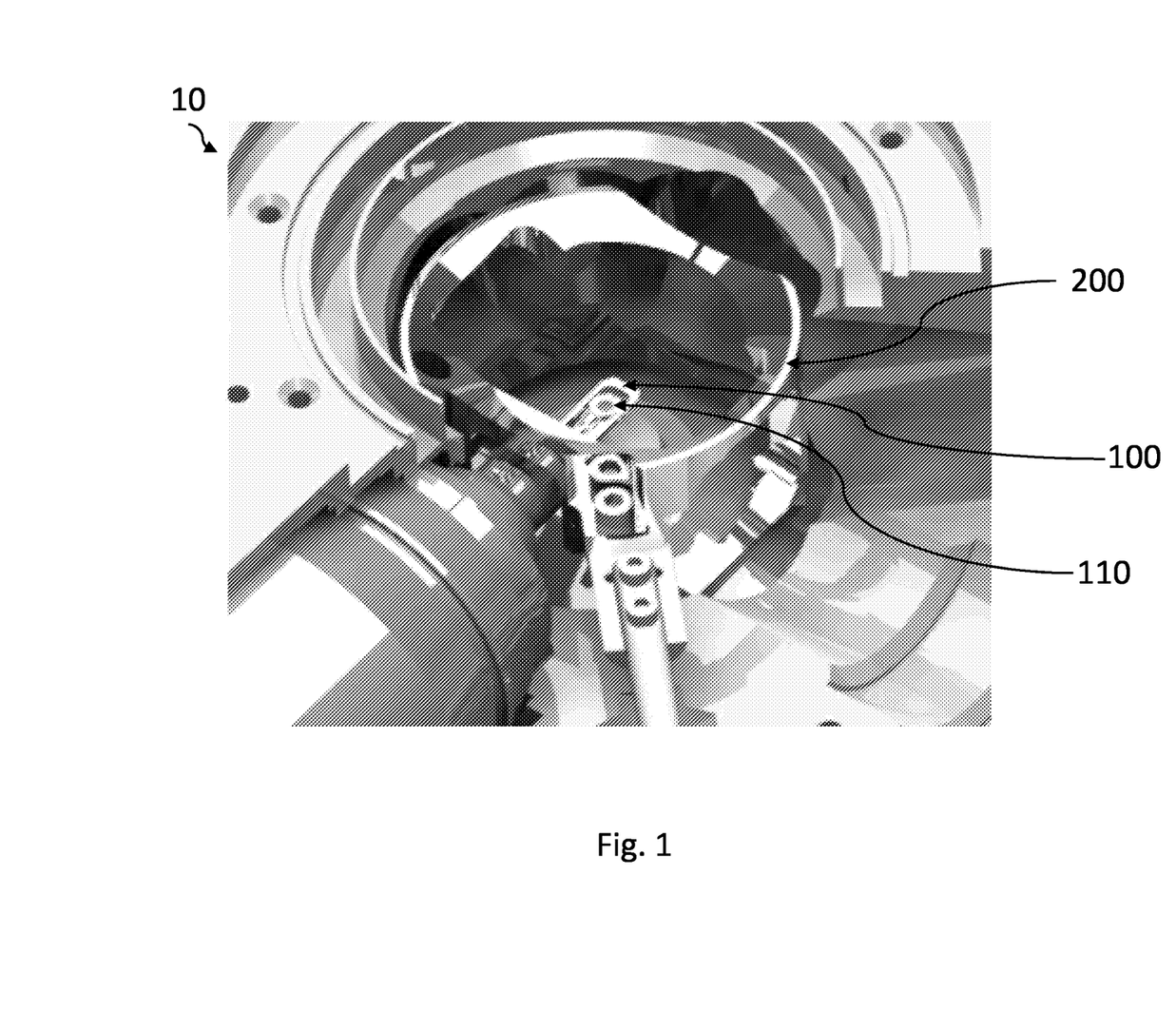
FIG. 1 depicts a vacuum chamber of a microscopy system.

FIG. 1 depicts a vacuum chamber 10 of a microscopy system in a perspective view. The vacuum chamber 10 may house a sample holder 100, configured to hold a sample (not shown) on its tip 110. The sample holder 100 may be configured to be inserted into and/or retracted from the vacuum chamber 10. The vacuum chamber 10 may also house a high emissivity component 200, which in this example is a cold trap, configured to liquefy any vapors that may contaminate the sample or the vacuum pump(s). In a typical microscopy system, the vacuum chamber 10 may be connected to a vacuum column comprising optics for directing and/or focusing a beam of particles that may illuminate the sample. The optics may comprise any of electromagnetic, electrostatic, magnetic, or optical lenses depending on the nature of particles comprising the beam of particles. For example, in an electron microscopy system the optics may comprise electromagnetic lenses. The particles may also comprise positively charged ions, or neutral photons.

The pressure in the vacuum chamber 10 may be less than $10^{-5}$ bar. The sample holder 100 may be at a temperature 0° C. and 100° C., preferably between 15° C. and 50° C., further preferably between 25° C. and 35° C. This may be significantly identical to the temperature inside the vacuum chamber 10. The cold trap 200, on the other hand, may be at a temperature between −273° C. and 0° C., preferably between −269° C. and −123° C., further preferably between −253° C. and −153° C. Alternatively, the cold trap 200 may comprise a temperature higher than the sample holder 100. Thus, there may be a temperature difference between the sample holder 100 and the cold trap 200, leading to an exchange of heat between them. The heat exchange may be dominated by radiation owing to the low pressure in the vacuum chamber 10 and because the two may not be in contact with each other.

Figure 2:
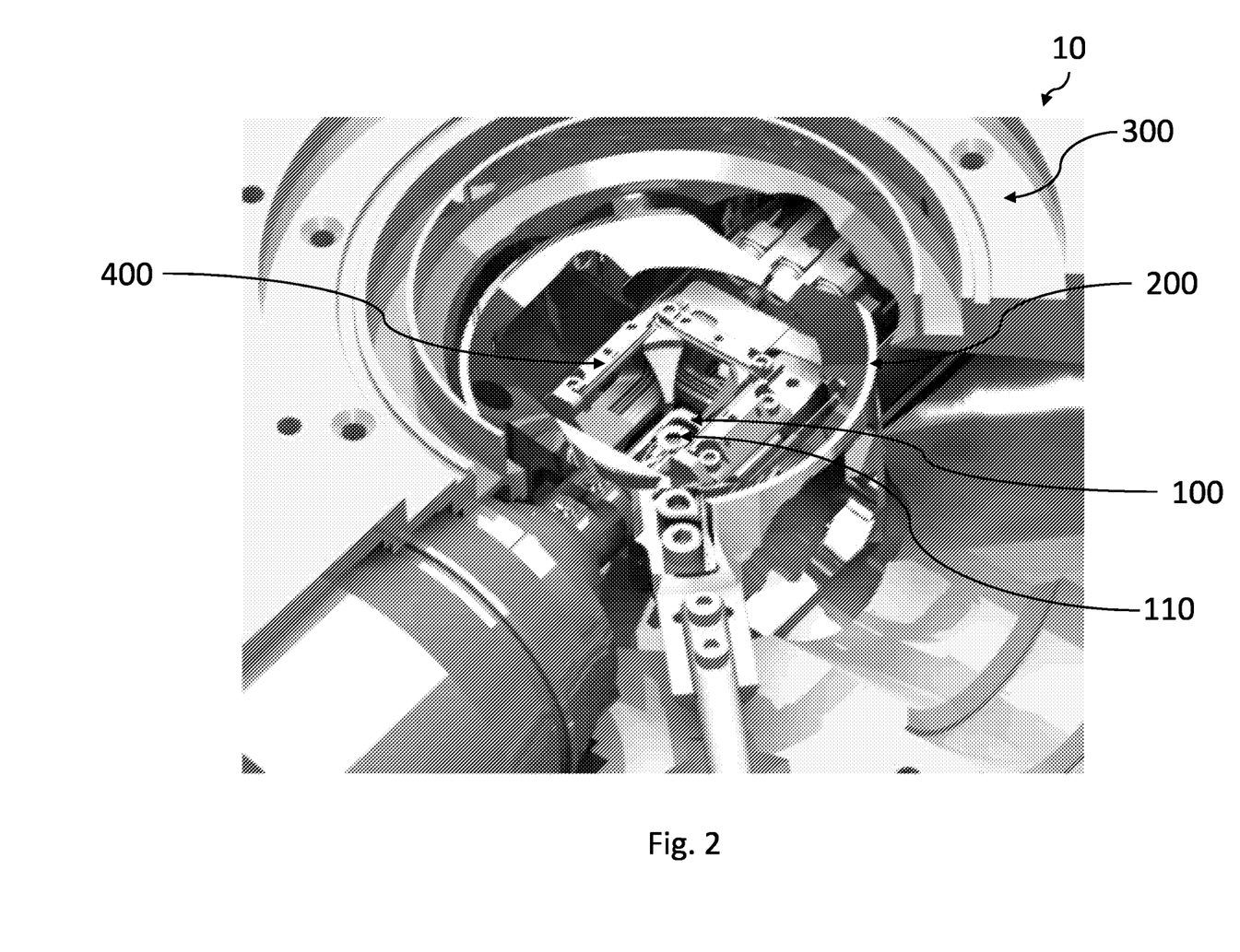
FIG. 2 depicts the vacuum chamber with a detector deployed in it.

FIG. 2 depicts the vacuum chamber 10 but with at least one detector 400 also inserted into the vacuum chamber 10. The detector 400 may also comprise a plurality of detectors. The detector 400 may comprise any of a CCD camera, a CMOS camera, a direct electron detector, a segmented silicon drift detector, an Everhart-Thornley detector, a charged particle multiplier, or any other detectors used in microscopy systems.

At least one of the detectors 400 may be configured to be located at a plurality of different distances from the sample holder 100, for example at least 2 different distances. This may be of advantage in configuring the positioning of the sample with respect to the beam of particles. The detector 400 may be provided with a means for expansion and retraction in this case.

The detector 400 may have a temperature between −273° C. and 0° C., preferably between −100° C. and 0° C., further preferably between −75° C. and −35° C. Alternatively, the detector 400 may have a temperature higher than the sample holder 100. Colder temperatures may help reduce dark current and improve the signal-to-noise ratio by reducing thermal noise. More particularly, the temperature of the detector 400 may be different from the temperature of the sample holder 100, particularly the tip section 110 of the sample holder 100. Thus, a heat flow may occur between the sample holder 100 and the detector 400. Owing to the low pressure of the vacuum chamber 10 and a lack of contact between the detector 400 and the sample holder 100, the heat flow may be dominated by radiation.

As described above, the detector 400 may be configured to be located at different distances from the sample holder 100. As a result, the rate of heat flow exchange between the detector 400 and the sample holder 100 may vary. When the detector 400 is closer to the sample holder 100, the rate of heat exchange may, for example, be larger than when the detector 400 is farther away. Similarly, owing to the variation in the distance of the detector 400 from the sample holder 100, the rate of heat exchange between the cold trap 200 and the sample holder 100 may also vary as the detector 400 may thermally shield, at least in part, the cold trap 200 when the detector 400 is, for example, closer to the sample holder 100. Thus, a variation in the rate of heat flow from the sample holder 100 may occur due to the variation in distance of the detector 400 from the sample holder 100.

It is an aspect of the present invention to reduce the variation in the rate of heat flow from the sample holder 100 resulting from the variation in distance of the detector 400. This may be of advantage in reducing the thermal drift of the sample holder 100 and consequently in reducing the drift of the image.

The variation in rate of heat flow from the sample holder 100 may be reduced by controlling its temperature, by using a heater for example, or by changing the geometries of any of the detector 400, the sample holder 100, or the cold trap 200. Changing the geometry may comprise changing a shape, changing a surface area, or changing any of the dimensions of an object. The variation may also be reduced by changing the relative positions of the three elements described above. Embodiments of the present technology aim to reduce the variation by modifying the thermal emissivity of any of the three objects, preferably of the cold trap 200, and by reducing the temperature variation at the sample holder 100. These will now be described with reference to the remaining figures.

Figure 3:
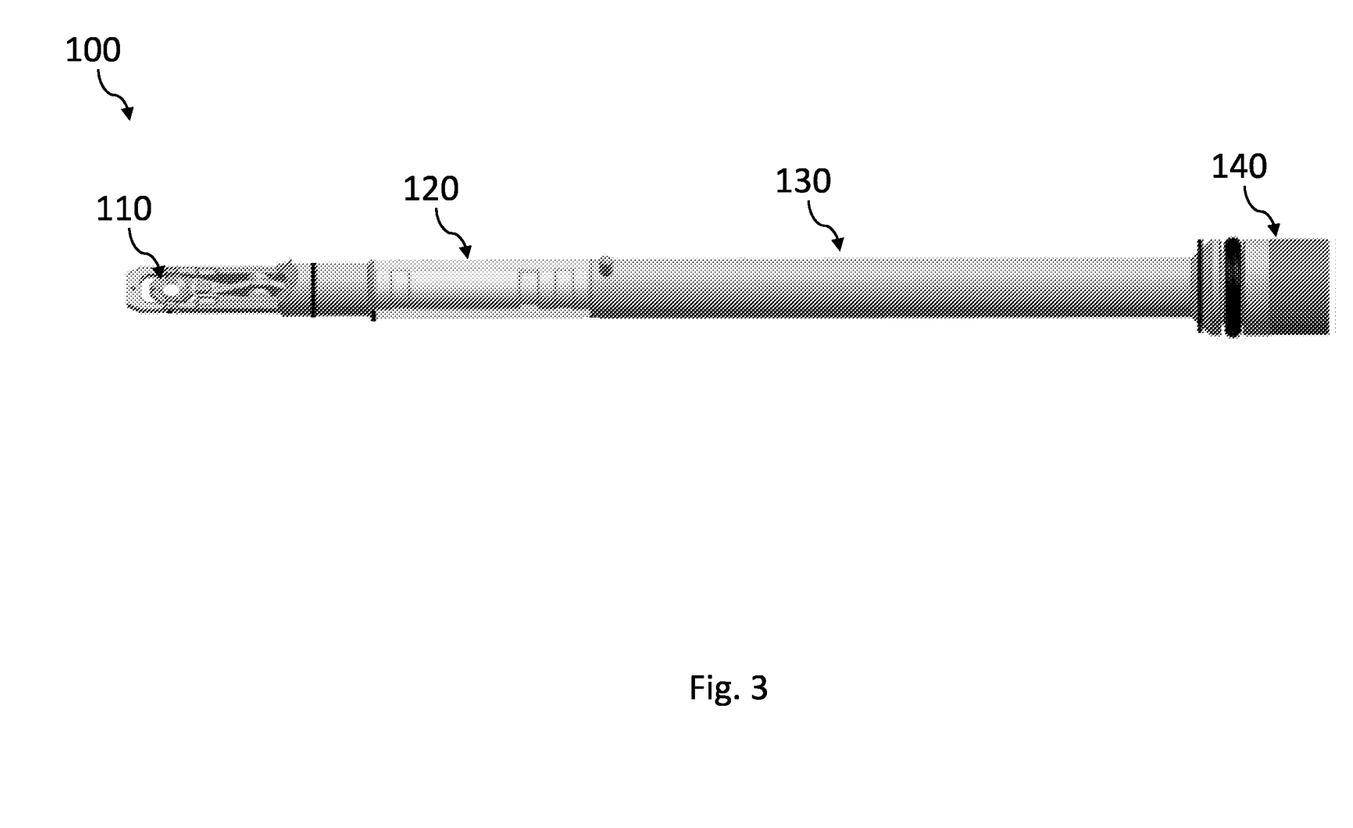
FIG. 3 depicts a sample holder for a microscopy system.

FIG. 3 depicts a typical sample holder 100 with its different sections. The sample holder 100 may comprise a tip section 110 configured to hold the sample. The tip section 110 may be located inside the vacuum chamber 10 during operation. The tip section 110 may also comprise a tilt mechanism configured to allow tilting of the sample. The rest of the sample holder 100 may comprise components configured to hold the tip section 110 and allow for controlling the tilt mechanism. More particularly, it may comprise the rod section comprising the components 120 and 130. The component 130 may have a temperature different from that of the tip section 110. This may lead to exchange of heat between the tip section 110 and the component 130, that may lead to a thermal drift of the tip section 110.

In order to reduce the heat flow between the tip section 110 and component 130, the component 120 of the rod section, that may be configured to lie within the vacuum chamber 10 during operation, may be fabricated with a material having a low thermal conductivity. The thermal conductivity may be between 0.1 W/m/K and 100 W/m/K, for example. Additionally, the component 120 may comprise a material with a low coefficient of thermal expansion which may further reduce thermal drift of the tip section 110. The coefficient of thermal expansion may be between $10^{-9}/°$ C. and $100/°$ C.

The sample holder 100 may further comprise a motor 140 configured to control the tilt mechanism of the tip section 110.

Figure 4:
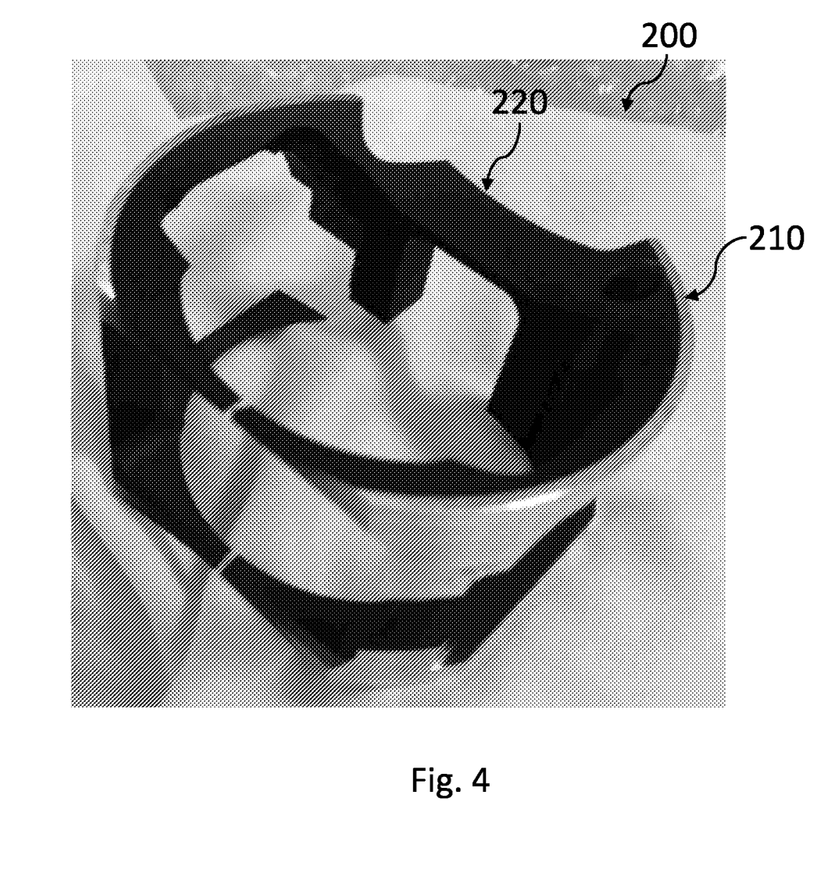
FIG. 4 depicts a cold trap for a microscopy system with a high emissivity coating.

FIG. 4 depicts the cold trap 200 in a perspective view. The cold trap 200 may comprise an outer casing 210, and in this particular embodiment, an inner coating 220. The coating 220 may comprise a material with a high thermal emissivity so as to increase the heat flow rate between the cold trap 200 and the sample holder 100. As a result of this increase heat flow rate, the effect of shielding of the cold trap 200 by the detector 400 when it is deployed close to the sample holder 100 is reduced. Thus, the variation in the heat flow rate from the sample holder 100 may be reduced.

The coating 220 may cover between 5% and 100% of the inner surface area of the cold trap 200. It may comprise a thermal emissivity between 0.5 and 1. It may have a uniform thickness over the entire surface area where it is applied, wherein the uniform thickness may be between 1 nm and 1 cm. Alternatively, the coating may not be uniform and the thickness may vary from a minimum value between 1 nm and 1 cm to a maximum value between 1 nm and 1 cm. The coating 220 may comprise an operational temperature between $-273°$ C. and $0°$ C., and may have operational wavelengths between 300 nm and 1000 μm. It may have an areal density between 0.1 mg/cm$^2$ and 10 mg/cm$^2$.

By using any of the embodiments described above, viz. coating the cold trap 200 or introducing a thermally insulating layer in the sample holder 100, the image drift may be reduced to between 1% to 100% of the image drift without any of the embodiments described above.

Figure 5:
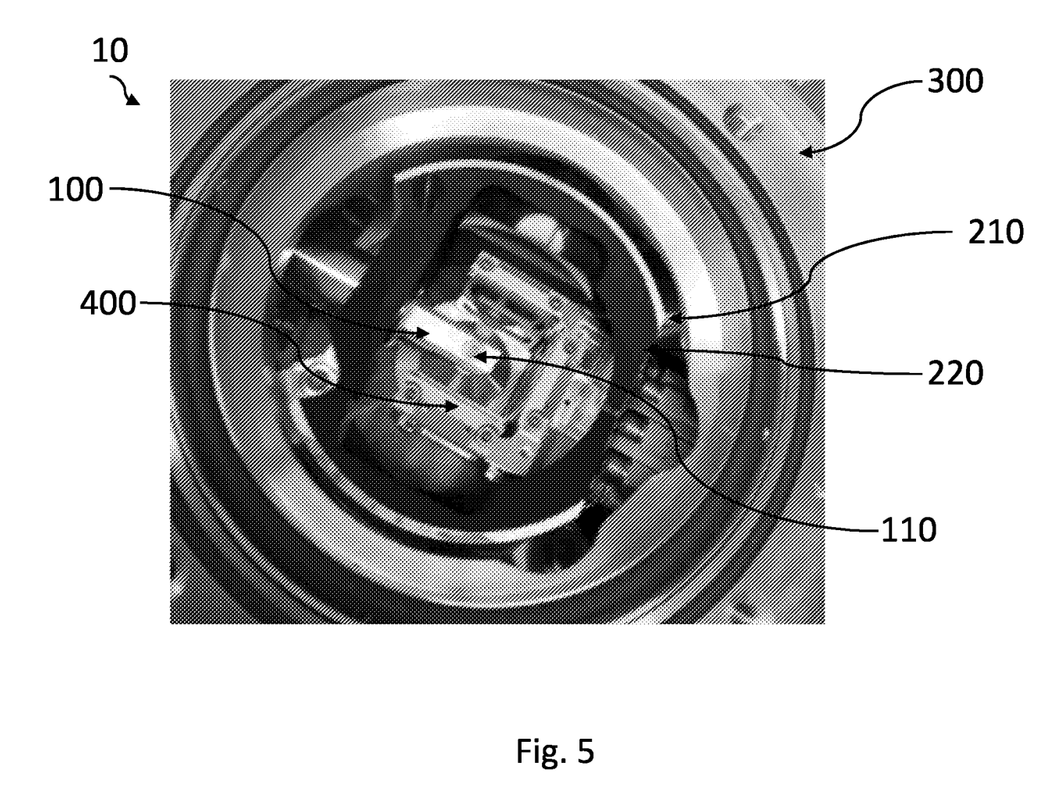
FIG. 5 depicts the cold trap deployed inside a vacuum chamber.

FIG. 5 depicts the cold trap 200 with the coating 220 as may be installed in a vacuum chamber 10. Owing to the coating, as described above, the heat flow rate from the sample holder 100 may be increased, and the variation arising from the change in the distance between the sample holder 100 and the detector 400 be reduced. Thus, a thermal drift of the sample holder 100 may be reduced, leading to lower image drifts.

Overall, embodiments of the present technology thus allow reduction of the image drift of a microscopy system and lead to improvements in efficiency of the imaging process.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment was provided for illustrative purpose only and should by no means be construed to limit the scope of the present invention, which is defined by the claims.

Below, sample holder embodiments will be discussed. These embodiments are abbreviated by the letter H followed by a number. Whenever reference is herein made to sample holder embodiments, these embodiments are meant.

H1. A sample holder for a microscopy system comprising a material with a low thermal conductivity for reducing a drift of the sample holder when inserted into a microscope.

H2. The sample holder according to the preceding embodiment, wherein the sample holder is configured to hold a sample so as to allow imaging at least a part of the sample in a microscope.

H3. The sample holder according to any of the preceding embodiments, wherein the sample holder comprises an elongated rod and a tip for holding the sample, wherein an intermediate part is provided between the rod and the tip, the intermediate part comprising the material with the low thermal conductivity.

H4. The sample holder according to the preceding embodiment, wherein a length of the intermediate part is between 0.01 and 20 times of the length of the rod.

H5. The sample holder according to any of the preceding embodiments, wherein the thermal conductivity is between 0.1 W/m/K and 100 W/m/K.

H6. The sample holder according to any of the preceding embodiments, wherein the sample holder comprises an ultra-low expansion (ULE) material, wherein a coefficient of thermal expansion of the ULE material is between $10^{-9}/°$ C. and $100/°$ C.

H7. The sample holder according to the preceding embodiment and with the features of embodiment H3, wherein the intermediate part comprises the ULE material.

H8. The sample holder according to any of the preceding embodiments and with the features of embodiment H3, wherein the intermediate part is manufactured by a casting process.

H9. The sample holder according to any of the preceding embodiments and with the features of embodiment H3, wherein the intermediate part is manufactured by an injection molding process.

H10. The sample holder according to any of the preceding embodiments and with the features of embodiment H3, wherein the intermediate part is manufactured by an additive manufacturing process.

Below, high emissivity component embodiments will be discussed. These embodiments are abbreviated by the letter T followed by a number. Whenever reference is herein made to high emissivity component embodiments, these embodiments are meant.

T1. A high emissivity component for a microscopy system comprising a sample holder, wherein the high emissivity component comprises, at least in part, a coating with a high thermal emissivity to increase a heat load between the sample holder and the high emissivity component.

T2. The high emissivity component according to the preceding embodiment, wherein the coating comprises a material with an operational electromagnetic wavelength between 300 nm and 1000 μm.

T3. The high emissivity component according to any of the preceding high emissivity component embodiments, wherein the coating comprises a material with a thermal emissivity between 0.5 and 1.

T4. The high emissivity component according to any of the preceding high emissivity component embodiments, wherein the coating comprises a material with a working temperature between −273° C. and 0° C.

T5. The high emissivity component according to any of the 4 preceding embodiments, wherein the coating comprises a material with an areal density between 0.1 mg/cm$^2$ and 10 mg/cm$^2$.

T6. The high emissivity component according to any of the preceding high emissivity component embodiments, wherein the high emissivity component is coated for a surface area ranging from at least 5% to at most 100%.

T7. The high emissivity component according to any of the preceding high emissivity component embodiments, wherein the coating has a uniform thickness over the coated part of the high emissivity component.

T8. The high emissivity component according to the preceding embodiment, wherein the uniform thickness is between 1 nm and 1 cm.

T9. The high emissivity component according to any of the preceding high emissivity component embodiments but without the features of any of the 2 preceding embodiments, wherein the coating has a variable thickness over the coated part of the high emissivity component.

T10. The high emissivity component according to the preceding embodiment, wherein a minimum thickness of the coating is between 1 nm and 1 cm and a maximum thickness of the coating is between 1 nm and 1 cm over the coated part of the high emissivity component.

T11. The high emissivity component according to any of the preceding high emissivity component embodiments, wherein the coating comprises a non-magnetic material.

T12. The high emissivity component according to any of the preceding high emissivity component embodiments, wherein the coating comprises an organic material.

T13. The high emissivity component according to any of the preceding high emissivity component embodiments, wherein the coating comprises an inorganic material.

T14. The high emissivity component according to any of the preceding high emissivity component embodiments, wherein the uncoated part of the high emissivity component comprises a material with a thermal emissivity between 0 and 90 for wavelengths between 300 nm and 1000 μm.

T15. The high emissivity component according to any of the preceding high emissivity component embodiments, wherein the high emissivity component comprises a cold trap.

Below, system embodiments will be discussed. These embodiments are abbreviated by the letter S followed by a number. Whenever reference is herein made to system embodiments, these embodiments are meant.

S1. A microscopy system comprising
a first element configured to have a first temperature (T1),
a second element configured to have a second temperature (T2), and
a third element configured to have a third temperature (T3), wherein the third element is configured to be located at a plurality of different distances from the first element,
wherein the microscopy system is configured to
at least image a sample and to reduce a drift of the image.

S2. The microscopy system according to the preceding embodiment, wherein the first element comprises a sample holder.

S3. The microscopy system according to any of the 2 preceding embodiments, wherein the first element comprises a sample holder according to any of the preceding sample holder embodiments.

S4. The microscopy system according to any of the preceding system embodiments, wherein the second element comprises a high emissivity component according to any of the preceding high emissivity component embodiments.

S5. The microscopy system according to any of the preceding embodiments, wherein the third element comprises a detector.

S6. The microscopy system according to any of the preceding system embodiments, wherein the second temperature is different from the first temperature and the third temperature is different from the first temperature.

S7. The microscopy system according to the preceding embodiment, wherein a heat flow between the first element and the second element is, at least in part, radiative.

S8. The microscopy system according to any of the 2 preceding embodiments, wherein a heat flow between the first element and the third element is, at least in part, radiative.

S9. The microscopy system according to the preceding embodiment, wherein a result of the variation in the distance of the third element from the first element is a variation in the radiative heat flow from the first element.

S10. The microscopy system according to any of the preceding system embodiments and with the features of embodiment S7, wherein a result of the variation in the distance of the third element from the first element is a variation in the radiative heat flow between the first element and the second element.

S11. The microscopy system according to any of the 2 preceding embodiments, wherein the microscopy system is configured to reduce a drift of the image by reducing the variation in the radiative heat flow from the first element as the distance to the third element is varied.

S12. The microscopy system according to the preceding embodiment, wherein the reduction in the variation in the radiative heat flow from the first element is between 1% and 100%.

S13. The microscopy system according to any of the preceding system embodiments, wherein the microscopy system comprises a vacuum chamber configured to house the first element, the second element, and the third element.

S14. The microscopy system according to the preceding embodiment, wherein a pressure in the vacuum chamber is less than $10^{-5}$ Pa.

S15. The microscopy system according to any of the 2 preceding embodiments, wherein a temperature of the vacuum chamber is significantly identical to the temperature (T1) of the first element.

S16. The microscopy system according to any of the preceding system embodiments and with the features of embodiment S6, wherein a difference between the first temperature and the second temperature is between 20° C. and 1000° C., preferably between 50° C. and 300° C., further preferably between 100° C. and 200° C.

S17. The microscopy system according to any of the preceding system embodiments and with the features of embodiment S6, wherein a difference between the first temperature and the third temperature is between 20° C. and 1000° C., preferably between 50° C. and 300° C., further preferably between 100° C. and 200° C.

S18. The microscopy system according to any of the preceding system embodiments, wherein the first temperature is between 0° C. and 100° C., preferably between 15° C. and 50° C., further preferably between 25° C. and 35° C.

S19. The microscopy system according to any of the preceding system embodiments, wherein the second temperature is between −273° C. and 0° C., preferably between −269° C. and −123° C., further preferably between −253° C. and −153° C.

S20. The microscopy system according to any of the preceding system embodiments, wherein the third temperature is between −273° C. and 0° C., preferably between −100° C. and 0° C., further preferably between −75° C. and −35° C.

S21. The microscopy system according to any of the preceding system embodiments, wherein the microscopy system is configured to direct a beam of charged particles at the sample.

S22. The microscopy system according to the preceding embodiment, wherein the charged particles comprise electrons.

S23. The microscopy system according to the penultimate embodiment, wherein the charged particles comprise ions.

S24. The microscopy system according to any of the preceding system embodiments and with the features of embodiment S21, wherein the microscopy system is further configured to accelerate the charged particles by applying a voltage between 1 V and 1000 kV.

S25. The microscopy system according to any of the preceding system embodiments, wherein the reduction in the image drift is between 1% and 100%.

Below, method embodiments will be discussed. These embodiments are abbreviated by the letter M followed by a number. Whenever reference is herein made to method embodiments, these embodiments are meant.

M1. A method for reducing an image drift of a microscopy system comprising a
- a first element configured to have a first temperature (T1),
- a second element configured to have a second temperature (T2), and
- a third element configured to have a third temperature (T3), wherein the third element is configured to be located at a plurality of different distances from the first element, wherein the method comprises imaging a sample and reducing a drift of the image.

M2. The method according to the preceding embodiment, wherein the first element comprises a sample holder.

M3. The method according to the preceding embodiment, wherein the first element comprises a sample holder according to any of the preceding sample holder embodiments.

M4. The method according to the preceding embodiment, wherein the method comprises reducing the drift of the image by reducing the thermal drift of the sample holder.

M5. The method according to any of the preceding method embodiments, wherein the second element comprises a high emissivity component according to any of the preceding high emissivity component embodiments.

M6. The method according to any of the preceding method embodiments, wherein the third element comprises a detector.

M7. The method according to any of the preceding method embodiments, wherein the microscopy system further comprises a vacuum chamber configured to house the first element, the second element, and the third element.

M8. The method according to any of the preceding method embodiments, wherein the second temperature is different from the first temperature and the third temperature is different from the first temperature.

M9. The method according to the preceding embodiment, wherein a heat flow between the first element and the second element is, at least in part, radiative.

M10. The method according to the any of the preceding embodiments and with the features of embodiment M8, wherein a heat flow between the first element and the third element is, at least in part, radiative.

M11. The method according to the preceding embodiment, wherein a result of the variation in the distance of the third element from the first element is a variation in the radiative heat flow from the first element, and wherein the method comprises reducing a drift of the image by reducing the variation in the radiative heat flow from the first element as the distance to the third element is varied.

M12. The method according to the any of the preceding embodiments and with the features of embodiment M9, wherein a result of the variation in the distance of the third element from the first element is a variation in the radiative heat flow between the first element and the second element, and wherein the method comprises reducing a drift of the image by reducing the variation in the radiative heat flow from the first element as the distance to the third element is varied.

The invention claimed is:

1. A cold trap for a microscopy system, the microscopy system comprising a sample holder and one or more detectors, wherein the cold trap comprises, at least in part, a coating comprising a material with a thermal emissivity between 0.5 and 1 to increase a heat flow between the sample holder and the cold trap, and wherein the cold trap is not in contact with the sample holder, and wherein, when the sample holder and the one or more detectors are positioned within a vacuum chamber of the microscopy system, an outer casing of the cold trap surrounds the sample holder and the one or more detectors.

2. The cold trap according to claim 1, wherein the cold trap operates between −269° C. and −123° C.

3. The cold trap of claim 1, wherein the one or more detectors are retractable.

4. A microscopy system, comprising:
a vacuum chamber;
a sample holder configured to have a first temperature (T1), wherein the sample holder is insertable into the vacuum chamber;
a cold trap according to claim 1 configured to have a second temperature (T2);
a detector configured to have a third temperature (T3), wherein the detector is configured to be selectively located at a plurality of different distances from the sample holder,
wherein the microscopy system is configured to:
image a sample held by the sample holder.

5. The microscopy system according to claim 4, wherein the cold trap comprises an outer casing, the sample holder comprises an elongated rod and a tip for holding the sample, and wherein the outer casing surrounds the tip when the sample holder is inserted into the vacuum chamber.

6. The microscopy system according to claim 5, wherein the coating covers at least a part of an inner surface of the outer casing.

7. The microscopy system according to claim 6, wherein the outer casing surrounds the detector when the detector is inserted into the vacuum chamber.

8. The microscopy system according to claim 4, wherein the sample holder comprises a material with a low thermal conductivity, wherein the sample holder comprises an elongated rod and a tip for holding the sample, wherein an intermediate part is provided between the rod and the tip, the intermediate part comprising the material with the low thermal conductivity.

9. The microscopy system according to claim 8, wherein the low thermal conductivity is between 0.1 W/m/K and 100 W/m/K.

10. The microscopy system according to claim 8, wherein the sample holder comprises an ultra-low expansion material, wherein a coefficient of thermal expansion of the ultra-low expansion material is between $10^{-9}$/° C. and 100/° C.

11. The microscopy system according to claim 4, wherein the second temperature is different from the first temperature and the third temperature is different from the first temperature.

12. The microscopy system according to claim 11, wherein a difference between the first temperature and the second temperature is between 20° C. and 1000° C.

13. The microscopy system according to claim 11, wherein a difference between the first temperature and the third temperature is between 20° C. and 1000° C.

* * * * *